US012796870B2

(12) United States Patent
Shun

(10) Patent No.: US 12,796,870 B2
(45) Date of Patent: Nov. 17, 2026

(54) SHOWER CURTAIN WITH ARM SLEEVES DEVICE

(71) Applicant: Matthew Shun, Glendale, CA (US)

(72) Inventor: Matthew Shun, Glendale, CA (US)

( * ) Notice: Subject to any disclaimer, the term of this patent is extended or adjusted under 35 U.S.C. 154(b) by 101 days.

(21) Appl. No.: 18/959,901

(22) Filed: Nov. 26, 2024

(65) Prior Publication Data

US 2026/0096696 A1 Apr. 9, 2026

Related U.S. Application Data

(60) Provisional application No. 63/703,289, filed on Oct. 4, 2024.

(51) Int. Cl.
*A47K 3/38* (2006.01)
*B08B 15/02* (2006.01)

(52) U.S. Cl.
CPC .............. *A47K 3/38* (2013.01); *B08B 15/026* (2013.01)

(58) Field of Classification Search
CPC . A47K 3/38; A47K 3/001; A47K 3/28; A47K 3/022; A47K 3/02; B08B 15/026
See application file for complete search history.

(56) References Cited

U.S. PATENT DOCUMENTS 2,756,438 A * 7/1956 Soberman ................ A47K 3/30 15/250.1
2,761,150 A * 9/1956 Kellogg ................... A47K 3/38 16/98
3,386,106 A * 6/1968 Clemens .................. A47K 3/38 4/608
4,126,172 A * 11/1978 Faragher, Jr. .......... A47H 23/06 428/187
5,771,504 A * 6/1998 Steiner ..................... A47K 3/38 4/558
5,826,284 A * 10/1998 Wren ....................... A47K 3/38 160/124
6,336,232 B1 * 1/2002 Toder ....................... A47K 3/38 4/558

(Continued)

FOREIGN PATENT DOCUMENTS

CA 2211602 A1 * 8/1997 ............... A47K 3/38
CA 2110824 C * 2/2001 ............... A47K 3/38

(Continued)

*Primary Examiner* — Lori L Baker
(74) *Attorney, Agent, or Firm* — Brennan, Manna & Diamond, LLC

(57) ABSTRACT

A shower curtain device is disclosed which comprises a body component that is configured in a rectangular shape, much like a traditional shower curtain. The arm sleeves are embedded within the body component on the front side and allow the user access to whoever is within the bathtub. Further, the body component is clear to allow for the user to see whoever is in the bath as well. Thus, the body component is easily applied to any bathtub and adjustable. The arm sleeves can be placed at multiple locations on the body component in order to accommodate for different bathing needs. Further, users simply need to reach their arms within the arm sleeves to help another person or pet bathe. The body component may also include optional weights, such as washers, added to the bottom edge to keep the shower curtain within the bathtub during use.

15 Claims, 3 Drawing Sheets

(56) References Cited

U.S. PATENT DOCUMENTS

| | | | | |
|---|---|---|---|---|
| 6,461,290 | B1 * | 10/2002 | Reichman | A61G 10/005 5/6 |
| 6,836,909 | B1 * | 1/2005 | Kirsopp | A47K 3/38 4/609 |
| 7,761,935 | B1 * | 7/2010 | Whitaker | A47K 3/38 4/558 |
| D683,564 | S | 6/2013 | Vagliardo | |
| 8,898,872 | B2 | 12/2014 | Raymond | |
| 10,016,252 | B1 * | 7/2018 | Wren, Sr. | A61G 10/005 |
| 10,905,839 | B1 * | 2/2021 | Bui | A61M 16/0672 |
| 11,077,005 | B1 * | 8/2021 | Economopoulos | A61B 46/40 |
| 11,089,911 | B1 * | 8/2021 | Battleson | A47K 3/38 |
| 2004/0231044 | A1 * | 11/2004 | Carter | H04N 5/64 4/609 |
| 2006/0185072 | A1 | 8/2006 | Dyckow | |
| 2008/0289095 | A1 * | 11/2008 | Li | A47K 3/38 4/610 |
| 2010/0222725 | A1 * | 9/2010 | Munzel | A47K 3/38 602/3 |
| 2011/0094985 | A1 | 4/2011 | Austin | |
| 2011/0145987 | A1 * | 6/2011 | Maes | A47K 3/38 4/610 |
| 2013/0061386 | A1 * | 3/2013 | Vagliardo | A47K 3/281 4/558 |
| 2016/0262577 | A1 | 9/2016 | Maner | |
| 2017/0290468 | A1 * | 10/2017 | Raymond | A47K 3/38 |
| 2018/0092485 | A1 * | 4/2018 | Viedt | A47H 1/02 |
| 2018/0255979 | A1 * | 9/2018 | Moore | A47K 3/38 |
| 2019/0045981 | A1 * | 2/2019 | Arnold | A47K 13/005 |
| 2019/0254487 | A1 * | 8/2019 | Raymond | A47K 3/38 |
| 2019/0282036 | A1 * | 9/2019 | Johnson | A47K 3/38 |
| 2019/0282037 | A1 * | 9/2019 | Johnson | A47K 3/38 |
| 2020/0170456 | A1 * | 6/2020 | Johnson | A47K 3/38 |
| 2020/0367699 | A1 * | 11/2020 | Hernandez | A47K 3/38 |
| 2021/0315758 | A1 * | 10/2021 | Bui | A61G 10/02 |
| 2021/0369059 | A1 * | 12/2021 | Battleson | A47K 3/38 |
| 2023/0008415 | A1 * | 1/2023 | Charlton | A47K 3/38 |
| 2025/0134320 | A1 * | 5/2025 | Tsibulevskiy | A45D 42/16 |
| 2025/0281003 | A1 * | 9/2025 | Li | A47H 1/022 |
| 2025/0352005 | A1 * | 11/2025 | Anderson | A47K 3/38 |

FOREIGN PATENT DOCUMENTS

| | | | | | |
|---|---|---|---|---|---|
| CA | 2520459 | C | * | 6/2008 | A47K 3/30 |
| CN | 104631869 | A | * | 5/2015 | A47K 3/38 |
| CN | 112790652 | A | * | 5/2021 | A47K 3/38 |
| CN | 112956927 | A | * | 6/2021 | E03C 1/04 |
| CN | 113197497 | A | * | 8/2021 | A47K 3/001 |
| CN | 219645109 | U | * | 9/2023 | E03C 1/04 |
| DE | 10136062 | A1 | * | 2/2003 | A47K 3/34 |
| EP | 1165006 | B1 | * | 5/2011 | A61G 7/1017 |
| GB | 2321404 | A | * | 7/1998 | E03C 1/04 |
| GB | 2417519 | A | * | 3/2006 | A47K 3/38 |
| GB | 2510143 | A | * | 7/2014 | A47K 3/38 |
| WO | WO-0222069 | A1 | * | 3/2002 | A61G 10/005 |
| WO | WO-2014145032 | A1 | * | 9/2014 | A61G 10/005 |
| WO | WO-2014189874 | A1 | * | 11/2014 | A61B 90/30 |

* cited by examiner

SHOWER CURTAIN WITH ARM SLEEVES DEVICE

CROSS-REFERENCE TO RELATED APPLICATION

The present application claims priority to, and the benefit of, U.S. Provisional Application No. 63/703,289, which was filed on Oct. 4, 2024, and is incorporated herein by reference in its entirety.

FIELD OF THE INVENTION

The present invention relates generally to the field of shower curtain devices. More specifically, the present invention relates to a shower curtain with arm sleeves. Accordingly, the present disclosure makes specific reference thereto. Nonetheless, it is to be appreciated that aspects of the present invention are also equally applicable to other like applications, devices and methods of manufacture.

BACKGROUND

By way of background, this invention relates to improvements in shower curtain devices. Generally, parents, pet owners, caregivers, medical professionals, etc. may need to help other people or their pet's bathe. Standing outside the shower while a person or pet is inside often leads to the parent or caregiver getting soaked with water. Further, pets, especially dogs, will shake their fur and fling water from the bathtub. Additionally, being forced to change clothing after helping others bathe can be frustrating.

Accordingly, a shower curtain constructed in accordance with the invention can be easily applied to a pre-existing shower bar. Further, it is often necessary for people to remain dry even while helping bathe others. Helping bathe someone is a constant need for many people and would be improved if the comfort of the bather could be maintained. Accordingly, having the bather soaking wet makes the bather unlikely to clean the other as often, simply because of the uncomfortableness of the act.

Accordingly, there is a demand for an improved shower curtain device that allows users to stay dry while bathing others. More particularly, there is a demand for a shower curtain device that users can keep in the bathtub during the bath experience.

Therefore, there exists a long felt need in the art for a shower curtain device that provides users with a shower curtain that prevents nurses, parents, pet owners, and other caregivers from getting wet when bathing patients, children, and/or animals. There is also a long felt need in the art for a shower curtain device that features glove-like arm sleeves on the front of the curtain that a caregiver can put their hands through and help a patient or pet bathe. Further, there is a long felt need in the art for a shower curtain device that allows caregivers to effectively lather and scrub people or pets while keeping their clothing dry. Moreover, there is a long felt need in the art for a device that offers a simple and convenient shower curtain that can be installed in bathrooms in homes, hospitals, nursing homes, vet clinics, and more. Further, there is a long felt need in the art for a shower curtain device that provides multiple arm sleeves installed along the front length of the curtain. Finally, there is a long felt need in the art for a shower curtain device that includes multiple sizes of arm sleeves.

The subject matter disclosed and claimed herein, in one embodiment thereof, comprises a shower curtain device.

The device is a modified shower curtain that can keep someone who is bathing a person, patient, or pet dry during the bathing process. The shower curtain device comprises a body component that is configured in a rectangular shape, much like a traditional shower curtain. The arm sleeves are embedded within the body component on the front side and allow the user access to whoever is within the bathtub. Further, the body component is clear or transparent to allow for the user to see whoever is in the bath as well. Thus, the body component is easily applied to any bathtub and adjustable. The arm sleeves can be placed at multiple locations on the body component in order to accommodate for different bathing needs. Further, users simply need to reach their arms within the arm sleeves to help another person or pet bathe. The body component may also include optional weights, such as washers, which can be added to the bottom edge of the body component to keep the shower curtain within the bathtub during use.

In this manner, the shower curtain device of the present invention accomplishes all of the forgoing objectives and provides users with a device that provides a shower curtain which keeps a user dry while they are bathing a pet or person. The device is a shower curtain with arm sleeves. The device can comprise a plurality of weights at the bottom edge.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a shower curtain device. The device is a modified shower curtain with arm sleeves. The shower curtain device comprises a body component that provides arm sleeves so that the user can bathe a person, patient, or pet without getting wet. Further, the body component is clear or transparent so that the user can see through it. Additionally, the body component is easily secured to a pre-existing shower bar. Further, the arm sleeves can be placed at multiple positions on the front of the body component to allow the user to reach all areas of the bathtub.

In one embodiment, the shower curtain device allows users to bathe someone without getting wet themselves. Further, the arm sleeves allow the user to stand behind the shower curtain while still being able to bathe whoever is within the bathtub. Accordingly, users can see through the device, making it easier to bathe others without causing a mess and wasting extra time on clean up.

In one embodiment, the shower curtain device comprises a body component that is configured in a rectangular shape. The body component comprises a front side facing away from the bathtub and a back side facing into the bathtub. However, the body component can be any suitable size as is known in the art, as long as the body component is sized to fit the length and width of a bathtub. Further, the body component is available in a variety of sizes to fit different sized bathtubs/showers.

In one embodiment, the body component comprises arm sleeves which are built into the front side of the body component. The arm sleeves are shaped like traditional gloves where the user places their arm through an opening in the front side of the body component and where the opening ends in the shape of a hand (i.e., similar to a glove) further within the bathtub area. Thus, the arm sleeves extend out from the back side of the body component and extend into the bathtub. This, thus, allows the user to have their hands within the bathtub area without physically touching anything within the bathtub area, except through the arm sleeves and glove parts.

In one embodiment, the arm sleeves found within the front side of the body component are placed at multiple locations on the body component. Thus, multiple arm sleeves are placed on one body component at different locations so as to encompass more area. In this same way, the arm sleeves can also be different heights to accommodate for different arm heights of the users, or to accommodate different sized people, children or pets within the bathtub, or to accommodate people or children that are sitting within the bathtub. Thus, a user can kneel beside the bathtub and still reach a user via the arm sleeves being positioned at a shorter height, preventing a user from having to stoop over while bathing someone.

In one embodiment, the body component is completely clear and transparent to allow for the user to accurately see the patient, person, or pet that is within the bathtub. However, it is also water repellent as it is still a functioning shower curtain. Thus, the body component is typically made from plastic, but can be any transparent, water-repelling material as is known in the art.

In one embodiment, the body component comprises weights that are placed on the bottom edge of the back side of the body component. These weights are small and circular, similar to washers or other suitable small weights. They are embedded in the body component, in a bottom hem area. The weights are positioned in a spaced apart position along the bottom hem and sewn or sealed into the body component. These weights specifically allow the body component to stay inside the bathtub so that water does not get everywhere during the bath process.

In one embodiment, the body component contains holes in the top edge of the body component, as similar to a conventional shower curtain. These holes are small and surrounded by a metal ring. These small holes allow a clip or hook to be attached to them and then to a shower bar. Thus, the shower curtain can be easily attached to a provided shower bar and adjusted to the preferred location.

In yet another embodiment, the shower curtain device comprises a plurality of indicia.

In yet another embodiment, a method of preventing users from getting wet while bathing others is disclosed. The method includes the steps of providing a shower curtain device comprising a body component with arm sleeves. The method also comprises connecting a hook or clasp to the small holes at the top of the body component and connecting it to a provided shower bar. Further, the method comprises placing the weights at the bottom of the body component within the bathtub. The method also comprises placing the user's hands through the arm sleeves. Finally, the method comprises bathing the person or pet within the bathtub without worry.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
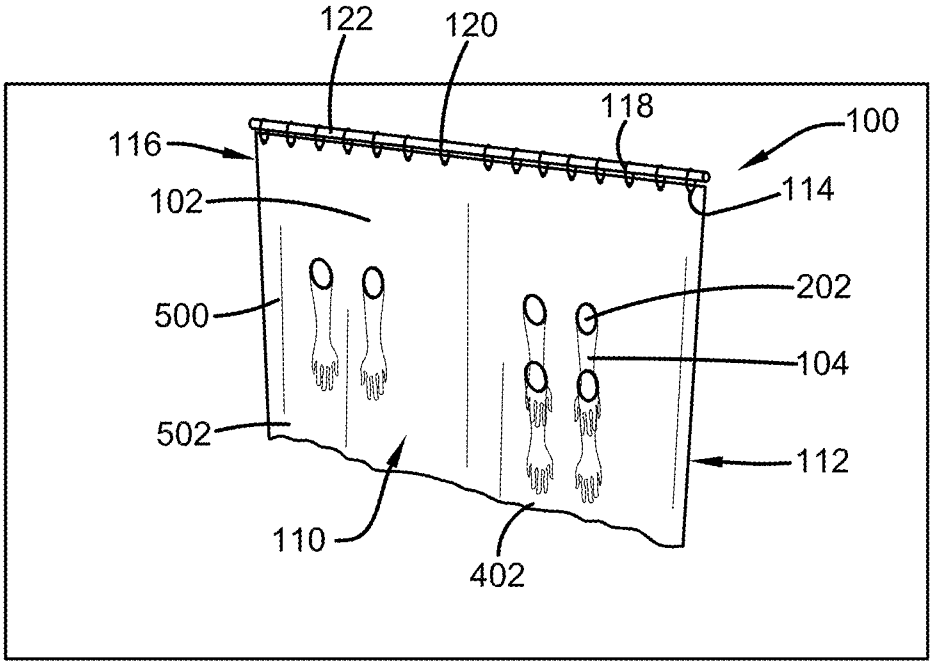
FIG. 1 illustrates a perspective view of one embodiment of the shower curtain device of the present invention showing the holes at the top and clasps in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a shower curtain device that provides users with a shower curtain that prevents nurses, parents, pet owners, and other caregivers from getting wet when bathing patients, children, and/or animals. There is also a long felt need in the art for a shower curtain device that features glove-like arm sleeves on the front of the curtain that a caregiver can put their hands through and help a patient or pet bathe. Further, there is a long felt need in the art for a shower curtain device that allows caregivers to effectively lather and scrub people or pets while keeping their clothing dry. Moreover, there is a long felt need in the art for a device that offers a simple and convenient shower curtain that can be installed in bathrooms in homes, hospitals, nursing homes, vet clinics, and more. Further, there is a long felt need in the art for a shower curtain device that provides multiple arm sleeves installed along the front length of the curtain. Finally, there is a long felt need in the art for a shower curtain device that includes multiple sizes of arm sleeves.

The present invention, in one exemplary embodiment, is a novel shower curtain device. The shower curtain device comprises a body component that is configured in a rectangular shape, much like a traditional shower curtain. The arm sleeves are embedded within the body component on the front side and allow the user access to whomever is within the bathtub. Further, the body component is clear to allow for the user to see whoever is in the bath as well. Thus, the body component is easily applied to any bathtub and adjustable. The arm sleeves can be placed at multiple locations on the body component. The body component may also include optional weights, such as washers, added to the bottom edge to keep the shower curtain within the bathtub during use. The present invention also includes a novel method of preventing users from getting wet while bathing others. The method includes the steps of providing a shower curtain device comprising a body component with arm sleeves. The method also comprises connecting a hook or clasp to the small holes at the top of the body component and connecting it to a provided shower bar. Further, the method comprises placing the weights at the bottom of the body component within the bathtub. The method also comprises placing the user's hands through the arm sleeves. Finally, the method comprises bathing the person or pet within the bathtub without worry.

Referring initially to the drawings, FIG. 1 illustrates a perspective view of one embodiment of the shower curtain device 100 of the present invention. In the present embodiment, the shower curtain device 100 is an improved shower curtain device 100 that provides a user 106 with a shower curtain with arm sleeves. Specifically, the shower curtain device 100 comprises a body component 102 and arm sleeves 104. Thus, the body component 102 is relatively large and adjustable. Further, the arm sleeves 104 and the body component 102 are clear and water-resistant.

Generally, the shower curtain device 100 allows users 106 to protect themselves from getting wet while bathing others. Further, the arm sleeves 104 can be used to allow the user 106 to stay dry behind the device 100 while bathing another person. Accordingly, users 106 can use different arm sleeves 104 on the same device 100 to reach different areas of the bathtub 108, such as if the other person is sitting in the bathtub instead of standing.

Further, the shower curtain device 100 comprises a body component 102 that is configured in a rectangular shape. The body component 102 comprises a front side 110 facing away from the bathtub 108 and a back side 112 facing into the bathtub 108. However, the body component 102 can be any suitable size as is known in the art, as long as the body component 102 is sized to fit the length and width of a bathtub 108. Further, the body component 102 is available in a variety of sizes to fit different sized bathtubs 108.

Additionally, the body component 102 contains holes 114 in the top edge 116 of the body component 102, similar to a conventional shower curtain. These holes 114 are small and surrounded by a metal ring 118. These small holes 114 allow a clip or hook 120 to be attached to them and then to a shower bar 122. Thus, the shower curtain device 100 can be easily attached to a provided shower bar 122 and adjusted to the preferred location. The shower curtain device 100 can thus fold in on itself accordion style for storage.

Figure 2:
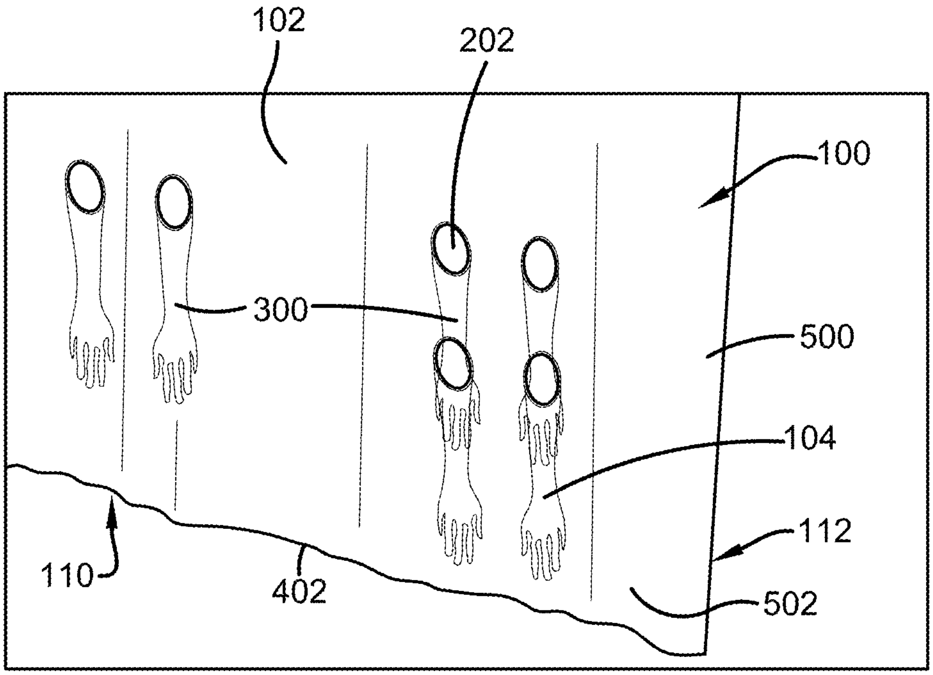
FIG. 2 illustrates a perspective view of one embodiment of the shower curtain device of the present invention showing the multiple different arm sleeves in accordance with the disclosed architecture.

As shown in FIG. 2, the body component 102 comprises arm sleeves 104 which are built into the front side 110 of the body component 102. The arm sleeves 104 are shaped like traditional gloves where the user 106 places their arm 200 through an opening 202 in the front side 110 of the body component 102 and where the opening 202 ends in the shape of a hand further within the bathtub 108. Thus, the arm sleeves 104 extend out from the back side 112 of the body component 102 and extend into the bathtub 108. This, thus, allows the user 106 to have their hands 204 within the bathtub area 108 without physically touching anything within the bathtub area 108, except through the arm sleeves 104 and glove parts.

Figure 3:
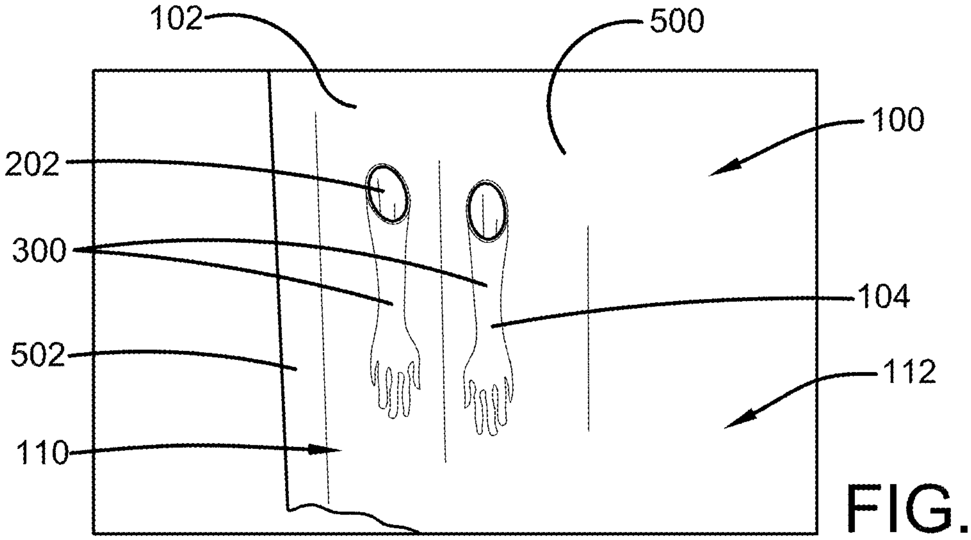
FIG. 3 illustrates a perspective view of one embodiment of the shower curtain device of the present invention showing the arm sleeves in accordance with the disclosed architecture.

As shown in FIG. 3, the arm sleeves 104 found within the front side 110 of the body component 102 are placed at multiple locations on the body component 102. Thus, multiple arm sleeves 300 are placed on one body component 102 at different locations so as to encompass more area. In this same way, the multiple arm sleeves 300 can also be different heights to accommodate for different arm heights of the users 106, or to accommodate different sized people, children or pets within the bathtub 108, or to accommodate people or children that are sitting within the bathtub 108. Thus, a user 106 can kneel beside the bathtub 108 and still reach a user 106 via the arm sleeves 104 being positioned at a shorter height, preventing a user 106 from having to stoop over while bathing someone.

Figure 4:
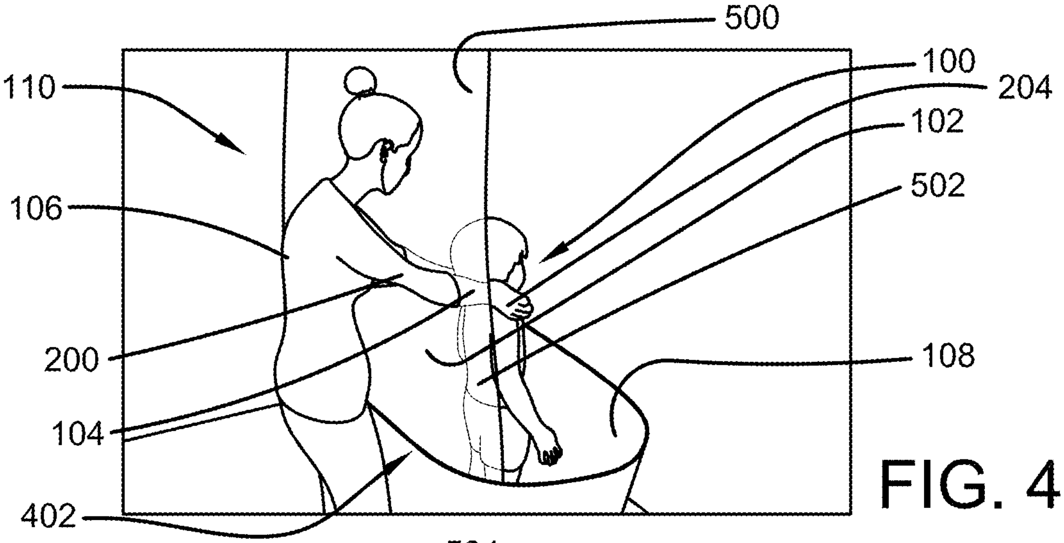
FIG. 4 illustrates a perspective view of one embodiment of the shower curtain device of the present invention showing the device in use in accordance with the disclosed architecture.

As shown in FIG. 4, the body component 102 comprises weights 400 that are placed on the bottom edge 402 of the back side 112 of the body component 102. These weights 400 are small and circular, similar to washers or other suitable small weights 400. They are embedded in the body component 102, in a bottom hem area 402. The weights 400 are positioned in a spaced apart position along the bottom hem 402 and sewn or sealed into the body component 102. These weights 400 specifically allow the body component 102 to stay inside the bathtub 108 so that water does not get everywhere during the bath process.

Figure 5:
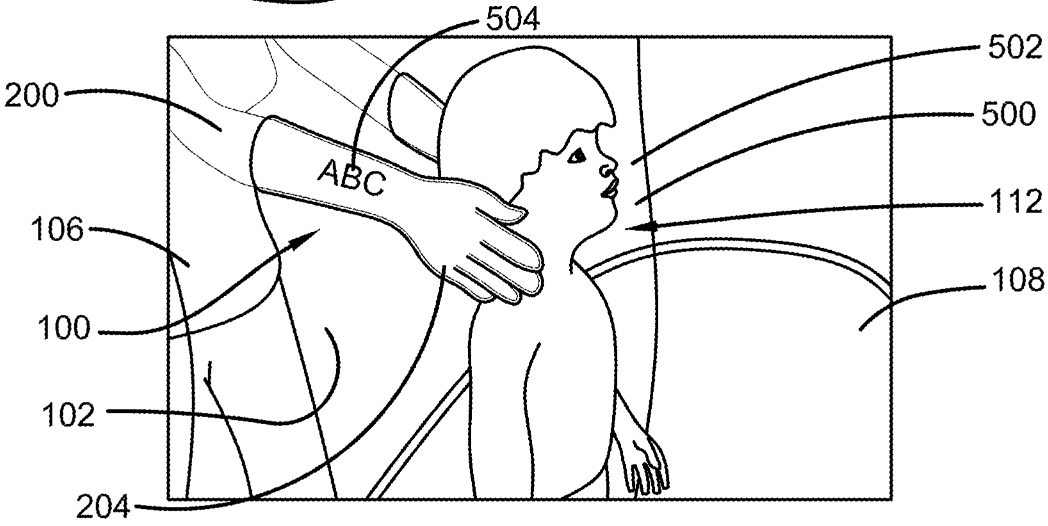
FIG. 5 illustrates a perspective view of one embodiment of the shower curtain device of the present invention showing the device in use in accordance with the disclosed architecture.

As shown in FIG. 5, the body component 102 is comprised of completely clear and transparent material 500 to allow for the user 106 to accurately see the patient, person, or pet that is within the bathtub 108. However, it is also water repellent as it is still a functioning shower curtain. Thus, the body component 102 is typically made from plastic material 502, but can be any transparent, water-repelling material 500 as is known in the art.

In yet another embodiment, the shower curtain device 100 comprises a plurality of indicia 504. The body component 102 of the device 100 may include advertising, a trademark, or other letters, designs, or characters, printed, painted, stamped, or integrated into the body component 102, or any other indicia 504 as is known in the art. Specifically, any suitable indicia 504 as is known in the art can be included, such as but not limited to, patterns, logos, emblems, images, symbols, designs, letters, words, characters, animals, advertisements, brands, etc., that may or may not be shower curtain, bathtub, or brand related.

Figure 6:
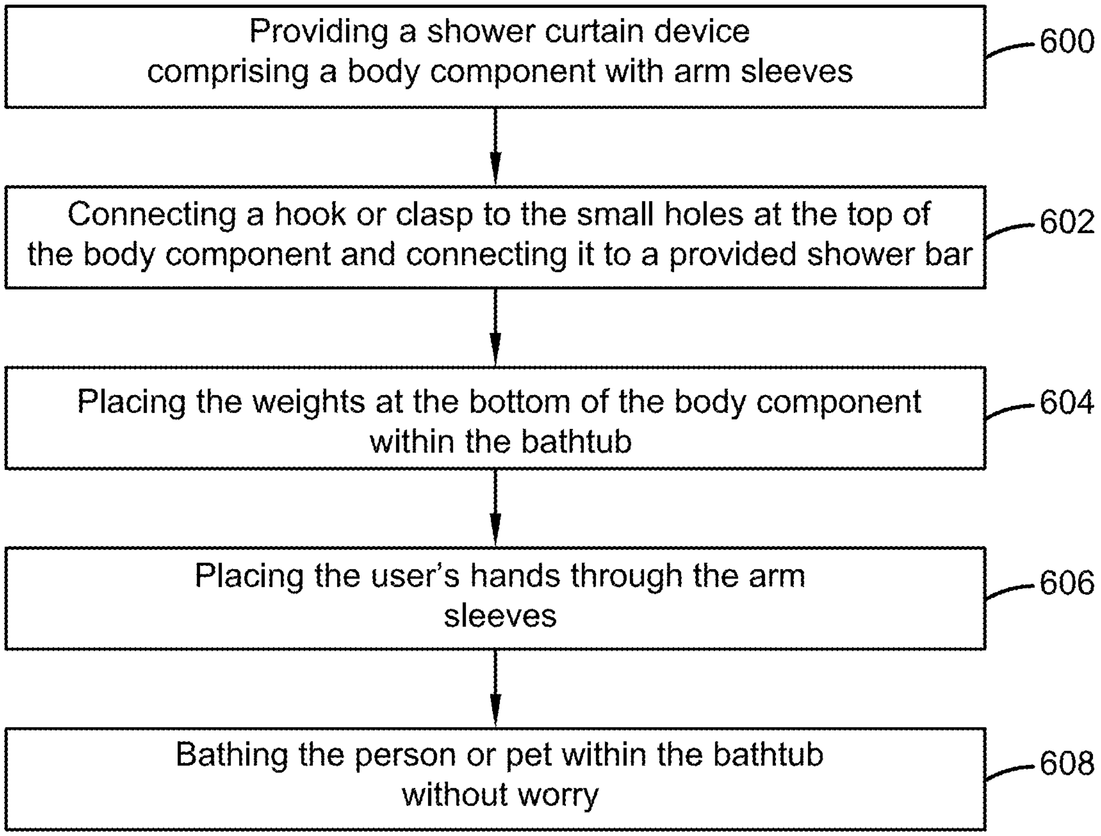
FIG. 6 illustrates a flowchart showing the method of preventing the user from getting wet while bathing another person in accordance with the disclosed architecture.

FIG. 6 illustrates a flowchart of the method of preventing users from getting wet while bathing others. The method includes the steps of at 600, providing a shower curtain device comprising a body component with arm sleeves. The method also comprises at 602, connecting a hook or clasp to the small holes at the top of the body component and connecting it to a provided shower bar. Further, the method comprises at 604, placing the weights at the bottom of the body component within the bathtub. The method also comprises at 606, placing the user's hands through the arm sleeves. Finally, the method comprises at 608, bathing the person or pet within the bathtub without worry.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "shower curtain device", "shower device", "curtain device", and "device" are interchangeable and refer to the shower curtain device 100 of the present invention.

Notwithstanding the forgoing, the shower curtain device 100 of the present invention can be of any suitable size and configuration as is known in the art without affecting the overall concept of the invention, provided that it accomplishes the above stated objectives. One of ordinary skill in the art will appreciate that the shower curtain device 100 as shown in FIGS. 1-6 is for illustrative purposes only, and that many other sizes and shapes of the shower curtain device 100 are well within the scope of the present disclosure. Although the dimensions of the shower curtain device 100 are important design parameters for user convenience, the shower curtain device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A shower curtain device that provides a user with a shower curtain with arm sleeves, the shower curtain device comprising:

a body component comprising a plurality of metal ringed holes;

a symbol indicia stamped into the body component; and a pair of arm sleeves; and wherein the pair of arm sleeves are embedded in a front side of the body component; and wherein the body component and the pair of arm sleeves are comprised of a transparent material.

2. The shower curtain device of claim 1, wherein the body component is configured in a rectangular shape.

3. The shower curtain device of claim 2, wherein the body component comprises a front side, a back side, and a top and bottom edge.

4. The shower curtain device of claim 3, wherein the pair of arm sleeves comprise an opening in the front side of the body component which then extends into the interior of the bathtub to form a long glove-like shape.

5. The shower curtain device of claim 4, wherein the pair of arm sleeves are made from same material as rest of the body component and are also transparent.

6. The shower curtain device of claim 5, wherein the pair of arm sleeves are positional at multiple locations on the front side of the body component.

7. The shower curtain device of claim 6, wherein the pair of arm sleeves are different lengths and heights to accommodate for the different arm lengths and heights of the user.

8. The shower curtain device of claim 7, wherein the body component comprises weights embedded within the bottom edge of the body component which are small and circular and allow for the body component to stay within the bathtub.

9. The shower curtain device of claim 8, wherein the body component is comprised of a plastic material to allow the body component to be able to do an accordion-style fold in on itself for storage as well as to be water repellent during the bathing process.

10. A shower curtain device that provides a user with a shower curtain with arm sleeves, the shower curtain device comprising:

a body component configured in a rectangular shape which is large enough to encompass a length of a bathtub;

an image indicia integrated into the body component; and a pair of arm sleeves; and wherein the body component comprises a front side, a back side, and a top and bottom edge;

wherein the body component is comprised of a clear and transparent material;

wherein the pair of arm sleeves are embedded in the front side of the body component and extend into the bathtub;

wherein the pair of arm sleeves are comprised of an opening which extends into a long glove-like shape;

wherein the pair of arm sleeves are comprised of same material as rest of the body component;

wherein the body component can be folded accordion-style for storage; and wherein the top edge of the body component further comprises a plurality of metal ringed holes.

11. The shower curtain device of claim 10, wherein the body component comprises weights embedded within the bottom edge which are small and circular and serve to weigh the body component down so that it stays within the bathtub during use.

12. The shower curtain device of claim 11, wherein the body component is comprised of a plastic material to be transparent, but also water-repellent.

13. The shower curtain device of claim 10, wherein the pair of arm sleeves are positional at multiple locations on the front side of the body component.

14. The shower curtain device of claim 13, wherein the pair of arm sleeves are different lengths and heights to accommodate for differing arm lengths and heights of users.

15. A method of preventing users from getting wet while bathing others, the method comprising the following steps:

providing a shower curtain device comprising a body component with arm sleeves;

connecting a hook or clasp to a plurality of small metal ringed holes at the top of the body component and connecting it to a provided shower bar;

placing the weights at the bottom of the body component within the bathtub;

placing the user's hands through the arm sleeves; and bathing the person or pet within the bathtub; and wherein the body component further comprises a pattern indicia painted onto the body component.

* * * * *